(12) United States Patent
Chiculiță

(10) Patent No.: US 8,902,235 B2
(45) Date of Patent: Dec. 2, 2014

(54) METHODS AND SYSTEMS FOR REPRESENTING COMPLEX ANIMATION USING SCRIPTING CAPABILITIES OF RENDERING APPLICATIONS

(75) Inventor: Alexandru Chiculiță, Bucharest (RO)

(73) Assignee: Adobe Systems Incorporated, San Jose, CA (US)

( * ) Notice: Subject to any disclaimer, the term of this patent is extended or adjusted under 35 U.S.C. 154(b) by 808 days.

(21) Appl. No.: 13/081,745

(22) Filed: Apr. 7, 2011

(65) Prior Publication Data

US 2012/0256928 A1    Oct. 11, 2012

(51) Int. Cl.
*G06T 13/00* (2011.01)
*G06T 13/20* (2011.01)

(52) U.S. Cl.
CPC ............. *G06T 13/20* (2013.01); *G06T 2213/04* (2013.01)
USPC ............................. 345/473; 345/475; 345/474

(58) Field of Classification Search
CPC .. G06T 13/00; G06T 2213/08; G06T 2213/04
See application file for complete search history.

(56) References Cited

U.S. PATENT DOCUMENTS

| | | | |
|---|---|---|---|
| 6,762,798 B1 | 7/2004 | Messer et al. | |
| 6,957,391 B2 | 10/2005 | Broussard | |
| 7,958,457 B1 | 6/2011 | Brandenberg et al. | |
| 8,164,596 B1 * | 4/2012 | Bech ............................. | 345/473 |
| 8,166,396 B2 | 4/2012 | Farn | |
| 8,407,321 B2 | 3/2013 | Mickens et al. | |
| 2002/0180790 A1 | 12/2002 | Broussard | |
| 2006/0005114 A1 | 1/2006 | Williamson et al. | |
| 2007/0078992 A1 | 4/2007 | Bloch et al. | |
| 2007/0139418 A1 * | 6/2007 | Abel et al. ..................... | 345/474 |
| 2008/0139301 A1 | 6/2008 | Holthe | |
| 2008/0303828 A1 * | 12/2008 | Marchant et al. ............. | 345/473 |
| 2009/0228784 A1 | 9/2009 | Drieu et al. | |
| 2009/0315894 A1 | 12/2009 | Goodwin | |
| 2010/0235820 A1 | 9/2010 | Khouzam et al. | |
| 2011/0193857 A1 | 8/2011 | Fillippov et al. | |
| 2011/0197124 A1 | 8/2011 | Garaventa | |
| 2013/0127875 A1 * | 5/2013 | Blas et al. ...................... | 345/473 |
| 2013/0127877 A1 * | 5/2013 | Blas et al. ...................... | 345/474 |
| 2013/0132840 A1 * | 5/2013 | Blas et al. ...................... | 715/719 |

OTHER PUBLICATIONS

"JSON in JavaScript" http://json.org/js.html. Archived on Mar. 7, 2006. Retrieved on Feb. 3, 2014 from <https://web.archive.org/web/20060307094212/http://json.org/js.html>.*

(Continued)

*Primary Examiner* — Kee M Tung
*Assistant Examiner* — Zhengxi Liu
(74) *Attorney, Agent, or Firm* — Kilpatrick Townsend & Stockton LLP

(57) ABSTRACT

A computerized device implements an animation coding engine to analyze timeline data defining an animation sequence and generate a code package. The code package can represent the animation sequence using markup code that defines a rendered appearance of a plurality of frames and a structured data object also comprised in the code package and defining a parameter used by a scripting language in transitioning between frames. The markup code can also comprise a reference to a visual asset included within a frame. The code package further comprises a cascading style sheet defining an animation primitive as a style to be applied to the asset to reproduce one or more portions of the animation sequence without transitioning between frames.

20 Claims, 5 Drawing Sheets

(56) References Cited

OTHER PUBLICATIONS

"Simple Animation in the HTML5 Canvas Element" http://html5.litten.com/simple-animation-in-the-html5-canvas-element. Archived on Sep. 12, 2010. Retrieved on Jan. 25, 2014 from <https://web.archive.org/web/20100912164221/http://html5.litten.com/simple-animation-in-the-html5-canvas-element>.*

"SVG and CSS—Cascading Style Sheets" http://tutorials.jenkov.com/svg/svg-and-css.html. Archived on Mar. 4, 2009. Retrieved on Jan. 28, 2014 from <http://web.archive.org/web/20090304005418/http://tutorials.jenkov.com/svg/svg-and-css.html>.*

"SVG and Canvas? Choosing between the two" http://dev.opera.com/articles/view/svg-or-canvas-choosing-between-the-two. Archived on Feb. 8, 2010. Retrieved on Jan. 25, 2014 from <https://web.archive.org/web/20100208152221/http://dev.opera.com/articles/view/svg-or-canvas-choosing-between-the-two>.*

"Using Canvas in SVG" http://www.svgopen.org/2009/papers/12-Using_Canvas_in_SVG/. Archived on Nov. 16, 2009. Retrieved on Jan. 25, 2014 from <https://web.archive.org/web/20091116023727/http://www.svgopen.org/2009/papers/12-Using_Canvas_in_SVG/>.*

"Macromedia Dreamweaver—Animating layers in a Dreamweaver 4 timeline" http://www.adobe.com/support/dreamweaver/interactivity/layers_timeline/index.html. Archived on Dec. 25, 2009. Retrieved on Jan. 29, 2014 from <https://web.archive.org/web/20091225151413/http://www.adobe.com/support/dreamweaver/interactivity/layers_timeline/index...*

"A bit of SVG and Canvas" http://nimbupani.com/a-bit-of-svg-and-canvas.html. Published on Aug. 26, 2009, Retrieved on Feb. 4, 2014.*

"Animation in Dreamweaver" http://www.adobetutorialz.com/articles/581/1/Animation-in-Dreamweaver. Archived on Apr. 18, 2007. Retrieved on Jan. 25, 2014 from <https://web.archive.org/web/20070418014940/http://www.adobetutorialz.com/articles/581/1/Animation-in-Dreamweaver>.*

Non final Office Action in related U.S. Appl. No. 13/018,830 dated May 9, 2013, 25 pages.

Non Final Office Action in Related U.S. Appl. No. 13/081,728, dated Jan. 11, 2013, 23 pages.

Non Final Office Action in Related U.S. Appl. No. 13/081,728, dated Oct. 25, 2013, 29 pages.

Final Office Action in Related U.S. Appl. No. 13/018,830, dated Dec. 3, 2013, 28 pages.

Final Office Action in Related U.S. Appl. No. 13/018,830, dated Apr. 30, 2014, 27 pages.

* cited by examiner

METHODS AND SYSTEMS FOR REPRESENTING COMPLEX ANIMATION USING SCRIPTING CAPABILITIES OF RENDERING APPLICATIONS

BACKGROUND

Animation is a popular way to provide content, whether for artistic, commercial, or other purposes. Runtime applications, such as those executed using the Adobe® Flash® player (available from Adobe Systems Incorporated of San Jose, Calif.), are an effective option for distributing animated content via the Internet. For instance, a runtime application can comprise code that, when executed in a corresponding runtime environment, presents a desired animation sequence, such as a one or more animated objects that move and/or otherwise change in a time-varying manner on a stage in an interface rendered by the runtime application. However, runtime-based animation may not always be available—for example, certain devices or platforms may not support use of a runtime environment. Developers may nonetheless wish to provide animated content for such platforms, such as animated content for use with rendering applications (e.g., browsers) that can provide animation but cannot work with the runtime environment.

SUMMARY

A computerized device includes a hardware interconnect and a data processing hardware element (e.g., a processor and/or hardware logic) interfaced to the hardware interconnect. The computerized device implements an animation coding engine to analyze timeline data defining an animation sequence and generate a code package. The code package can represent the animation sequence using markup code that defines a rendered appearance of a plurality of frames and a structured data object also comprised in the code package and defining a parameter used by a scripting language in transitioning between frames. The markup code can also comprise a reference to a visual asset included within a frame. The code package further comprises a cascading style sheet defining an animation primitive as a style to be applied to the asset to reproduce one or more portions of the animation sequence without transitioning between frames.

These illustrative embodiments are discussed not to limit the present subject matter, but to provide a brief introduction. Additional embodiments include computer-readable media embodying an application configured in accordance with aspects of the present subject matter to provide an animation coding engine. Embodiments also include computer-implemented methods for generating code packages that can be processed by a rendering application to provide animation based on rendering frames and invoking animation primitives native to the rendering application. These and other embodiments are described below in the Detailed Description. Objects and advantages of the present subject matter can be determined upon review of the specification and/or practice of an embodiment configured in accordance with one or more aspects taught herein.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
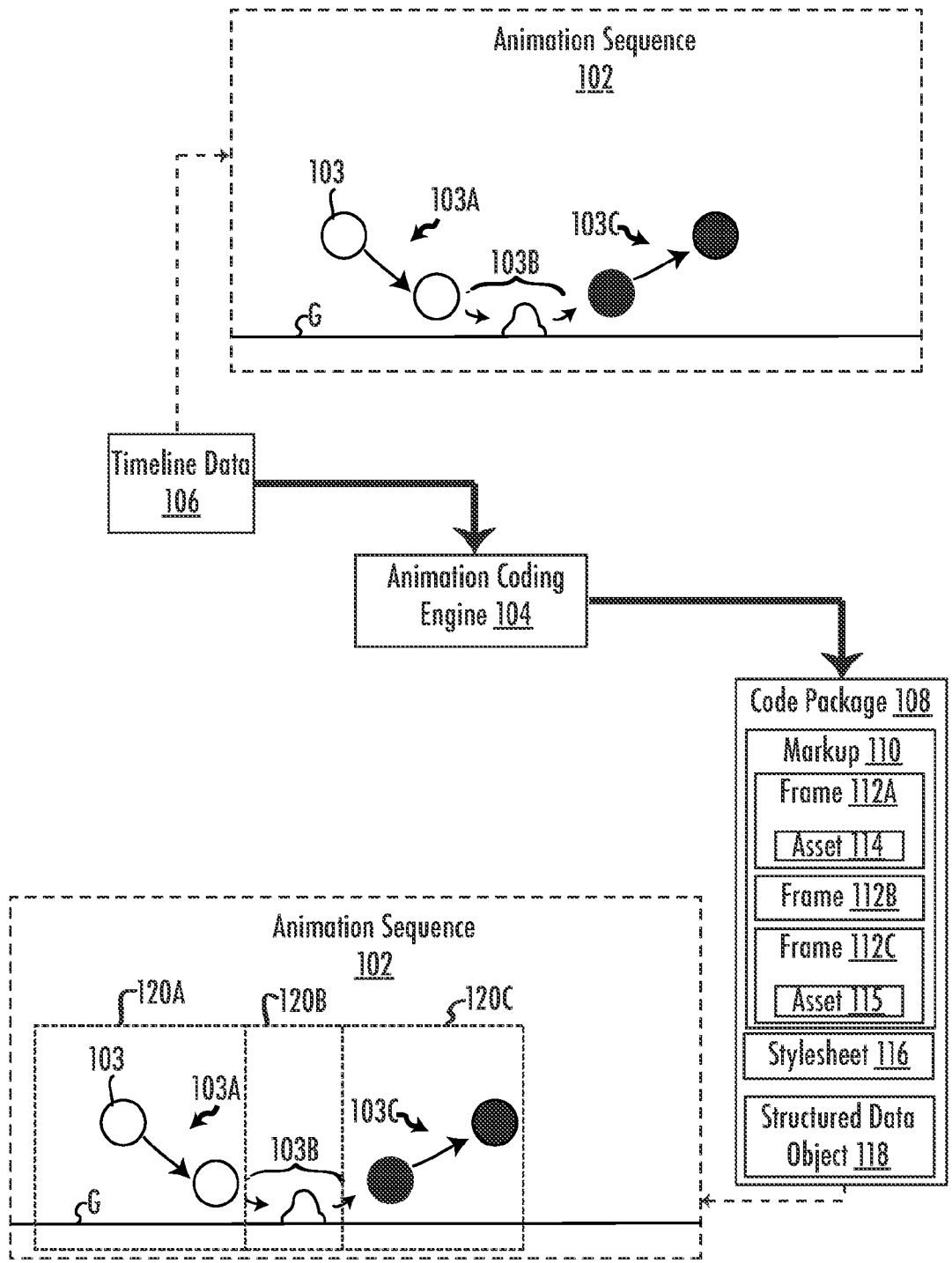
FIG. 1 is a diagram of an illustrative animation sequence.

Presently-disclosed embodiments include computing systems, methods, and computer-readable media embodying code. FIG. 1, for example, shows an illustrative animation sequence 102 representing a change in appearance over time of an object 103. Animation sequence 102 is analyzed by an animation coding engine 104, which accesses timeline data 106 representing the animation sequence and produces a code package 108 which represents the animation sequence using markup code, a stylesheet, and a structured data object (e.g., a JSON (JavaScript Object Notation) object) that controls how a scripting language (e.g., JavaScript) can be used to control transitions between portions of the animation as represented in code package 108 (i.e., the scripting is used to orchestrate the animation).

In this particular example, animation sequence 102 features a ball 103 which travels across the screen as shown at 103A, deforms and bounces from ground G as shown at 103B, and changes color after bouncing and proceeds on as shown at 103C. Animation sequence 102 may, for example, be represented using timeline data 106 comprised in a source or compiled file for execution by a runtime environment, such as a FLA source file that can be compiled into a SWF file executable using the Adobe® Flash® or AIR® runtime environments (both available from Adobe Systems Incorporated of San Jose, Calif.). Timeline data 106 may be in another compiled or uncompiled form.

Not all computing platforms may support playback using a runtime environment. Thus, animation coding engine 104 can be used to convert timeline data 106 into code package 108, which when rendered by a rendering application (e.g., a browser) provides the same or nearly the same animation sequence 102. For example, code package 108 can comprise markup code 110, such as HTML code, that defines a rendered appearance of entire frames of the animation as shown at 112A, 112B, and 112C. Some or all of the frames 112 may include asset code 114/115 to draw or render a visual asset (e.g., a vector or raster graphic of ball 103) within the frame. Stylesheet 116 may be included in markup code 110 or in a separate file referenced by markup code 110 and can be used to define a style which, when applied to one or more visual assets, applies an animation primitive to change the appearance of the visual asset.

Structured data object 118 can include one or more parameters identifying the various components of code package 108 and timing information for use by a scripting language to control when rendered frames 112 are visible, transitions between the frames 112, and to control when styles defined in stylesheet 116 are used to apply the animation primitives.

For example, timeline data 106 may include a reference to raster or vector graphic data defining an appearance of ball 103, ground area G, and locations of ball 103 and ground area G over a number of keyframes (ground area G likely having one location). Because timeline data 106 is in a format to be compiled or rendered by a runtime environment, timeline data 106 may simply rely on the runtime environment to handle the visual transitions shown at 103A, 103C, and even the deformation shown at 103B. On the other hand, code package 108 may be intended for a rendering application (e.g., a browser) that has limited native animation capabilities. Accordingly, animation coding engine 104 can generate markup code to define portions of animation sequence 102 according to the rendering application's expected capabilities.

For example, the translation of ball 103 as shown at 103A may correspond to an animation primitive supported by a browser. Thus, animation coding engine 104 can define a rendered frame 120A whose appearance represented using suitable code 112A (e.g., an HTML <canvas> element) with a visual asset 114 (e.g., a SVG (scalable vector graphics) or other image file representing ball 103) in the frame. A style can be included in stylesheet 116 to apply an animation primitive (e.g., the Webkit-translate primitive) to move ball 103 from its starting location to its ending location prior to bounce portion 103B.

The rendering application may not natively support an animation primitive that corresponds to the distortion of ball 103 as shown at 103B, and so animation coding engine 104 can include markup code 112B to define a plurality of rendered frames 120B each representing an appearance of portion 103B of the animation sequence at a given step in time. For example, markup code 112B may comprise a <canvas> element with suitable commands to visually reproduce each rendered frame.

Then, another rendered frame 120C can be defined in code 112C, with an asset 115 representing ball 103 in its changed color, with another animation primitive used to reproduce the motion shown at 103C. Structured data object 118 can be populated with data identifying the various frames and suitable parameters so that JavaScript or another scripting language can be used to orchestrate the animation. That is, scripting can be used to display the keyframes 120A-120B-120C in order by controlling visibility of those frames and transition between the frames. Additionally, scripting can be used to activate the animation primitives while a frame is displayed, as appropriate (e.g., to apply styles from stylesheet 116 to move asset 114,115 representing ball 103).

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment.

In the following detailed description, numerous specific details are set forth to provide a thorough understanding of the subject matter. However, it will be understood by those skilled in the art that the subject matter may be practiced without these specific details. In other instances, methods, apparatuses or systems that would be known by one of ordinary skill have not been described in detail so as not to obscure the subject matter.

Figure 2:
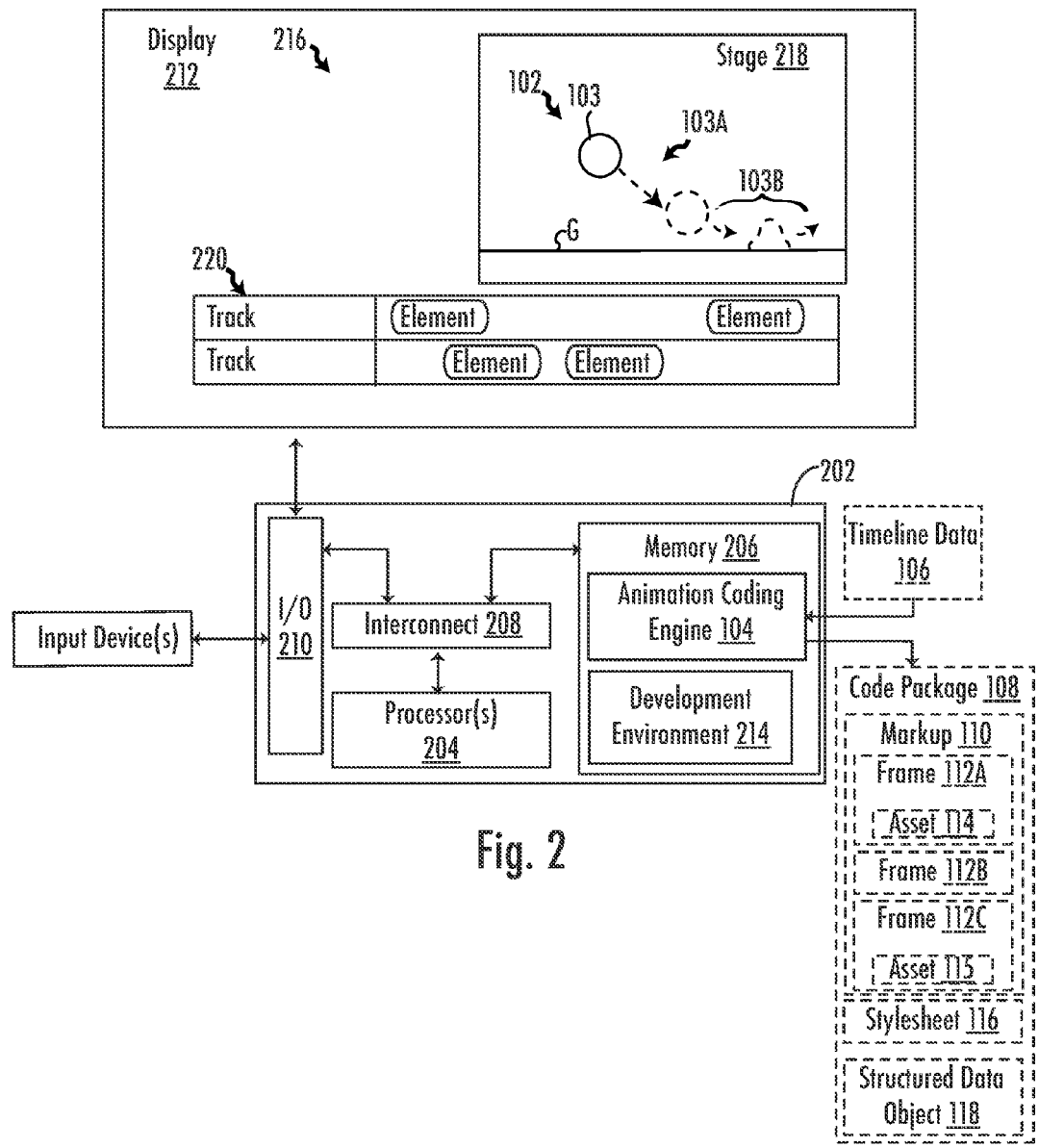
FIG. 2 is a diagram showing an illustrative computing device implementing an animation coding engine.

FIG. 2 is a diagram showing an illustrative computing device 202 being used to convert animation sequence 102 into code package 108. Computing device 202 may alternately be referred to as a data processing system, computerized device, or simply a "computer." Computing device 202 represents a desktop, laptop, tablet, or any other computing system. Other examples of computing device 202 include, but are not limited to, servers, mobile devices (PDAs, smartphones, media players, gaming systems, etc.), televisions, gaming systems, and set-top boxes, and embedded systems (e.g., in vehicles, appliances, or other devices).

Generally speaking, computing device 202 features one or more data processing hardware elements implementing an animation coding engine 104. Animation coding engine 104 causes computing device 202 to analyze timeline data 106 defining animation sequence 102 and generate code package 108 representing the animation sequence 102. In this example, animation sequence 102 is movement of ball 103 across the stage, but in practice animation sequences may be much more complex. As noted above, the code package is generated so that, when the code is processed by rendering application, scripting and native animation capabilities of a rendering application are invoked to provide the animation sequence by drawing keyframes, transitioning between keyframes, and using applicable animation primitives for visual assets within keyframes.

Animation coding engine 104 can be implemented in hardware accessible by or as part of the data processing element (e.g., as an application-specific integrated circuit, (ASIC), programmable logic device (e.g., PLAs, FPGAs, etc.)). As another example, animation coding engine 104 can be implemented using software or firmware that configures the operation of a processor or processors.

In the example shown in FIG. 2, computing device 202 features a data processing hardware element comprising one or more processors 204 and a computer-readable medium (memory 206) interconnected via an interconnect 208, representing internal busses, connections, and the like. Interconnect 208 also connects to I/O components 210, such as universal serial bus (USB), VGA, HDMI, serial, and other I/O connections to other hardware of the computing system. The hardware also includes one or more displays 212. It will be understood that computing device 202 could include other components, such as storage devices, communications devices (e.g., Ethernet, radio components), and other I/O components such as speakers, a microphone, or the like. Generally speaking, interconnect 208 is used to store the generated code package, such as in a local hard drive, network storage, and/or to relay the generated code via a network connection to a destination. Input is provided via suitable input devices such as a mouse, keyboard, touch screen interface, etc.

Computer-readable medium 206 may comprise RAM, ROM, or other memory and in this example embodies a development environment 214 and the animation coding engine 104. More generally, development environment 214 is provided as an example of one or more applications or processes utilizing or including animation coding engine 104. For example, development environment 214 may comprise a development application such as Adobe® Flash® Professional, available from Adobe Systems Incorporated, and suitably modified to include or utilize animation coding engine 104.

As shown here, development environment 214 provides a user interface 216 that includes a stage 218 and a timeline 220. Stage 218 can be used to arrange one or more objects that are to be animated, with timeline 220 providing a visual representation of timeline data 106 and usable to select time intervals. For example, timeline 220 may be used to select different frames or other time index units, with animated objects and other elements (e.g., scripting elements) positioned at different locations at the different frames. In some implementations, development environment 214 may support tweening and other operations so that a user does not need to specify every intermediate position of an object—instead, the user may specify starting and ending locations in respective key frames and/or a desired path, with development environment 214 handling the details of correctly positioning the object(s) in between the key frames either during design or by including data in the resulting output file to invoke transitions during execution by a runtime application.

For example, a user may specify a starting and ending location for ball 103 and development environment 214 generates executable/interpretable bytecode that invokes functionality of a runtime player to smoothly translating the ball toward and away from ground G, provide the bounce shown at 103B, and implement subsequent color change and movement at 103C (not visible in FIG. 2). Although this example shows a stage and timeline, a development environment may support other methods for receiving input specifying an animation sequence. For example, a source code view may be provided, with the animation specified through suitable syntax for specifying the location and motion of objects.

In this example, animation coding engine 104 is shown as part of a client-side development environment. However, animation coding engine 104 could be deployed at a remote server. For example, a web service may host animation coding engine 104 and provide a client-side front end for providing a user interface whereby a user can define the animation sequence. As another example, animation coding engine 104 could be deployed as part of a web service that receives timeline data 106 from a client and returns code package 108 in response.

As a further example, animation coding engine 104 can access timeline data 106 from storage in response to a client request for the animation. Based on information in the request from the client (e.g., a requesting browser's user agent), animation coding engine 104 can optimize the code package for a specific client platform. For example, if a particular browser or other rendering application does not support SVG, animation coding engine 104 can use <canvas> elements to direct the rendering application to draw graphic elements instead. As another example, if the browser or other rendering application does not support CSS or animations (or no animation primitives at all), appropriate scripting elements can be included instead. For example, if a browser does not support any accelerated animations, scripting elements can be used to drive the entire animation.

Figure 3:
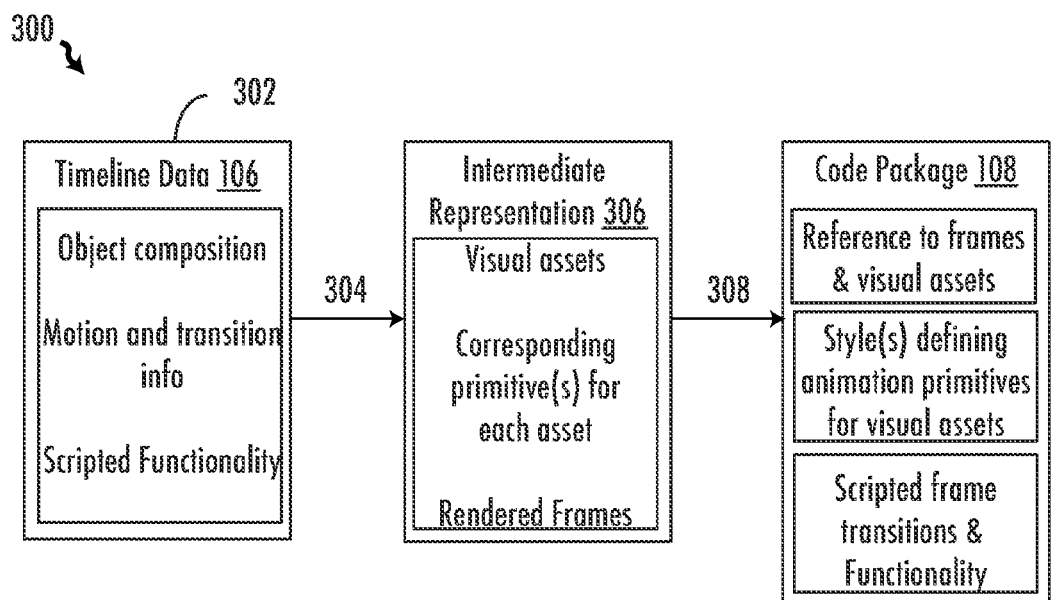
FIG. 3 is a data flow diagram showing the code generation process.
Figure 4:
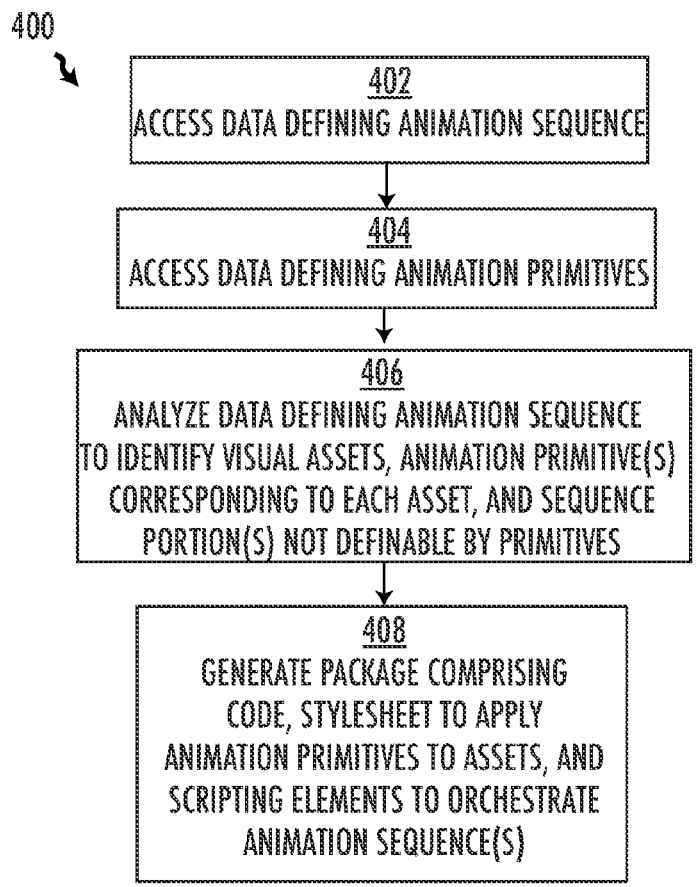
FIG. 4 is a flowchart showing an illustrative method for generating a code package based on timeline data.
Figure 5:
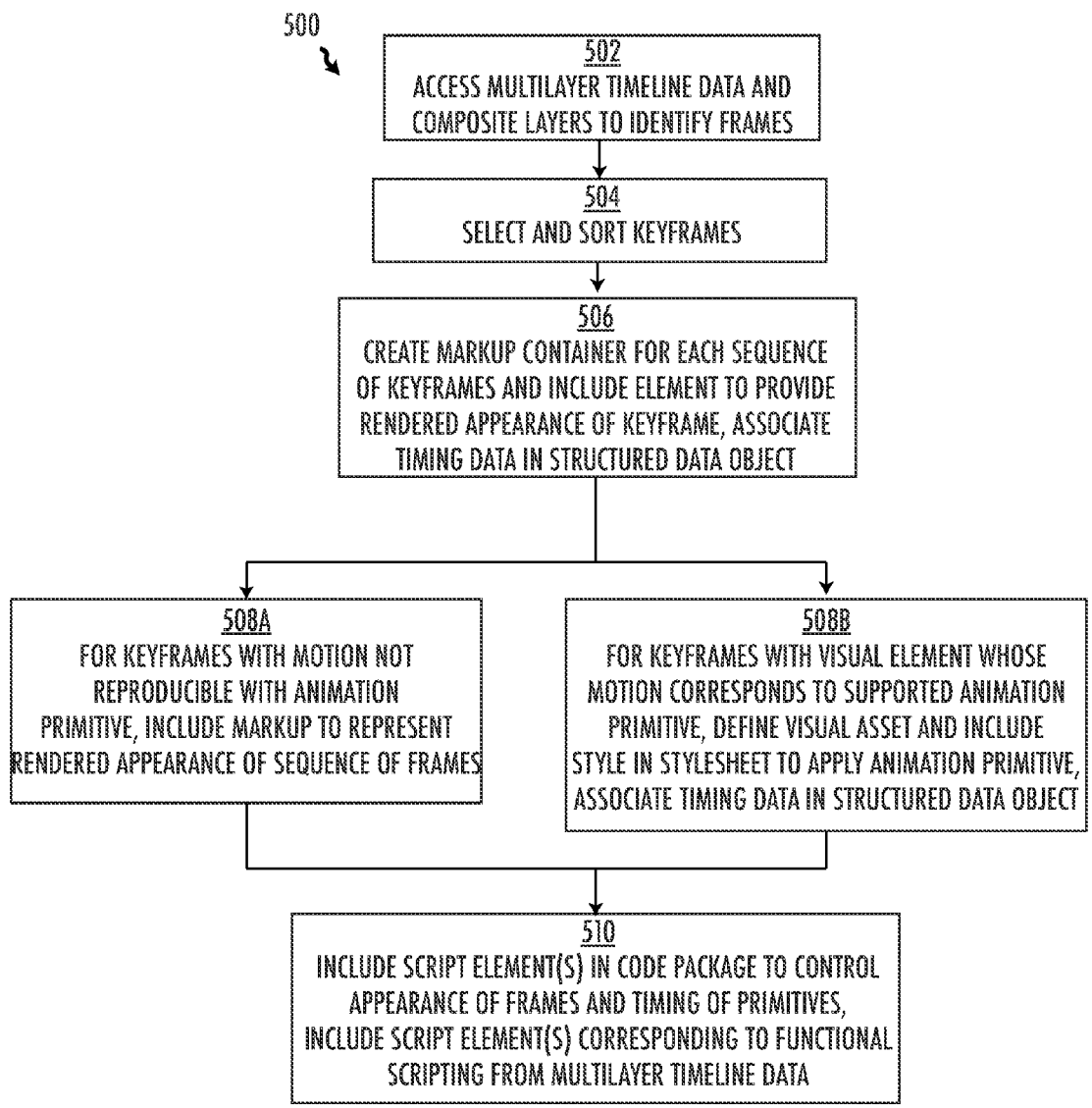
FIG. 5 is a flowchart showing an example of analyzing timeline data and generating a code package.

In any event, animation coding engine 104 is provided with access to timeline data 106 specifying the details of animation sequence 102 and uses that data to generate code that can be processed by a rendering application to replicate the animation sequence. FIG. 3 is a data flow diagram 300 generally showing the code generation process, carried out by animation coding engine 104 executed by computing system 202, while FIG. 4 is a flowchart discussing an illustrative code generation method 400. FIG. 5 illustrates an example of code generation in detail.

As shown at 302 of FIG. 3, animation coding engine 104 begins from the timeline data 106 defining the animation sequence of one or more animated objects. For example, timeline data 106 may comprise source code and/or an object model of a runtime application, such as source code of a Flash® application. However, it will be understood that timeline data 106 can comprise another representation of an animation sequence that provides information about object composition (i.e. object identity and visual appearance) and motion and transition information (i.e., where the object is and when, changes to the object's form, etc.).

In some implementations, timeline data 106 can also include one or more scripting elements defining a function associated with at least one object in the animation sequence. For example, the function may be to provide an effect such as a change in an appearance of an animated object or some other behavior (e.g., opening a dialog box) to provide when an object is clicked on.

As shown at 304, this data is analyzed to determine visual assets comprising the animated object(s) along with data identifying motion and/or other time-varying properties of the visual assets as the animation sequence occurs. An object as represented in timeline data 106 may, practically speaking, be animated using one visual asset or multiple visual assets manipulated in concert with one another.

For example, as noted above, ball 103 of FIG. 1 may be defined using vector or raster graphics that specify a desired appearance of the ball. A more complex object may include multiple components whose motion is coordinated in the animation—for example a soccer ball may include visual elements for its individual panels. Additionally, timeline data 106 may define interrelationships among the assets, such as joints between arms and legs of an animated body. For example, movie defined by timeline data 106 may include nested timelines—i.e., components in one timeline that are themselves represented as a plurality of other components. For instance, wheels of a bicycle may each have their own timeline defining rotation behavior, with the wheels included in a main timeline defining motion of the entire bicycle (e.g., body and wheels).

By analyzing how the underlying visual assets move or otherwise vary over time, animation coding engine 104 can determine a first portion of the animation sequence that can be represented using a set of visual assets animated using animation primitives and a second portion of the animation sequence that can be represented by using a scripting language to control transitions between fully rendered frames. Engine 104 produces a representation of the animation as a set of visual assets, corresponding animation primitives, and rendered frames as shown at 306.

As shown at 308, code package 108 can be generated by selecting appropriate code statements for the rendering application that is to process code package 108. For example, in some implementations code package 108 is provided as an HTML file along with a CSS3-compliant style sheet and a JSON structured data element. The HTML file can define the appearance of the rendered frames and can also reference the visual assets along with statements to invoke styles defined in the style sheet. The style sheet can be populated with style definitions for the corresponding animation primitives. The JSON element can include identification of the keyframes and timing parameters so that an applicable script can be used to display the animation sequence. The script defining the display and timing operations carried out in scripting can be included in or referenced by the HTML file.

When a rendering application such as a browser processes code package 108, the rendering application can carry out the script to render the frames in order, using the native animation capabilities based on the style definitions for the portion(s) of the animation sequence that correspond to primitives (if any) supported by the rendering application.

Additionally, as shown at 308, when code package 108 is generated, the animation coding engine can also include a corresponding scripting element (or elements) to implement the scripting function from timeline data 106. For example, if a scripting element included in timeline data 106 implemented a function to provide a pop-up window or other effect when a target object in animation sequence 102 is clicked, animation coding engine 104 can include corresponding scripting element(s) in code package 108 and associated with the markup element(s) representing the target object in code package 108.

FIG. 4 is a flowchart showing an illustrative method 400 for generating a code package 108 which may be carried out by animation coding engine 104 of FIGS. 1-2 according to the data flow of FIG. 3.

Block 402 represents accessing data defining an animation sequence, the animation sequence depicting motion of at least one object over time. For instance, the animation sequence may be defined in terms of a location on a stage for each of one or more objects and corresponding time index values. As a particular example, a development environment may maintain a core object model and codebase for the application under development. The object model/codebase can include data representing the various application components, including the object(s) to be animated (e.g., ball 103 of FIG. 1) along with scripting components and other data defining the desired time-varying activity of the object(s) the be animated, including motion, transition effects, and the like (e.g., starting and ending locations of ball 103, a number of frames during which the translation occurs, parameters defining how the ball is deformed at bounce portion 103B, the color transition at 103C, etc.).

Block 404 represents accessing data identifying animation primitives supported by a markup language. For instance, animation coding engine 104 may be hard-coded to recognize some or all of a set of animation operations that can be invoked through use of a style sheet, such as a CSS3 stylesheet. As another example, animation coding engine 104 may selectively access different sets of primitives supported by different style sheet languages, different rendering applications, and the like based on a desired output format. If the code package is to be customized based on browser or rendering application capabilities, then block 404 represents determining which primitives are supported by the particular browser or rendering application.

Block 406 represents analyzing the data defining the animation sequence to determine a set of frames and visual assets with corresponding animation primitives usable to represent the motion of the at least one object over time. For example, animation coding engine 104 may use the data describing object positions over time and/or data defining time-varying activity of the objects to identify a first portion of the animation sequence in which object movement/behavior can be matched to animation primitives. The animated object(s) can be broken down into one or more visual assets, with each visual asset animated individually in a way so that the original timing of the portion of the animation sequence is maintained along with the intended relative position of the animated object(s).

Animation coding engine 104 may also use the data to determine a second portion of the animation sequence that can be represented by using a scripting language to control transitions between fully-rendered key frames. For instance, animation coding engine 104 may fall back to use of rendered frames if the set of animation primitives does not support object movement/behavior in the animation sequence. As a particular example, bounce portion 103B of animation sequence 102 and/or the change in color of ball 103 may have no counterpart animation primitive. Thus, animation coding engine 104 can determine that those portion(s) of animation sequence 102 are to be represented using directly-rendered frames.

Block 408 represents generating a package that causes a rendering application to provide the animation sequence by using a scripting language. The package comprises markup code defining a rendered appearance of the keyframes along with markup references to the set of visual assets for the portion(s) of the animation sequence that can be represented using animation primitives.

A stylesheet defines the corresponding animation primitives as styles to be applied to the visual assets. The package is generated so that, when the markup code is processed by a rendering application, the rendering application uses a scripting engine (as configured by a structured data object) to coordinate rendering of the portion(s) of the animation sequence represented using animation primitives and the portion of the sequence represented directly using rendered frames. For example, a set of files can be provided as discussed above in conjunction with FIG. 1, the set of files including markup code renderable by a browser and referencing a stylesheet.

FIG. 5 is a flowchart showing illustrative steps in a method 500 for analyzing data defining an animation sequence and generating a code package 108. For example, the flow shown in FIG. 5 may be used by animation coding engine 104 as implemented by a device such as computer 202 of FIG. 2.

Block 502 represents accessing multilayer timeline data and compositing layers to identify the rendered content of frames. For instance, the Flash® runtime noted above can utilize source files in the FLA format to define a movie which may contain multiple scenes and symbols that each have their own timeline. Each timeline can have multiple layers. The overall movie has a frame rate used to calculate the time at which the next frame is displayed. The content of one frame of the movie can be defined by compositing the contents of each layer from bottom to top to determine an arrangement of visual (and other) features at each point in time across the length of the movie. The frame content can be generally defined as including shapes—edges and filling styles used to render the shape. During the conversion process, shapes can be converted to graphics, such as SVG files or HTML5<canvas> or other markup drawing commands. Raster graphics may also be used in some embodiments.

Block 504 represents selecting and sorting keyframes of the movie by order of appearance. For instance, the timeline data 106 defining the movie may define at least some portions of the animation sequence using key frames showing a rendered appearance of the animation at a point in time, with portions of the animation between the keyframes to be "filled in" by the runtime application according to other data included in the timeline data 106 to cause rendering of the full portion of the animated sequence. For instance, animation sequence 102 of FIG. 1 may be defined by a key frame representing an initial position of ball 103, a key frame indicating a location of bounce portion 102B, and a key frame indicating the final location of ball 103. The details of portions 103A,B, and C may be defined by other data in timeline data 106 (e.g., path data indicating how ball 103 moves, transform data defining how ball 103 is distorted during its collision with G, gradient data on how the color change is defined etc.).

Block 506 represents generating a markup container for each sequence of keyframes. For example, an HTML "<div>" element can be created for each sequence of two keyframes. As an example, assume that portion 103B of animation sequence 102 begins at frame 10 and ends at frame 20. A <div> element can be created for frames 1 to 9 (i.e., portion 103A) and another <div> element for frames 10-20 (portion 103B). Continuing with the example, another <div> element can be created for the frames representing portion 103C.

Timing data can be associated with the structured data object to indicate to the scripting language which <div> elements in the markup code correspond to keyframes of the plurality of frames and to indicate when frames are to be made visible. For example, the structured data object can include <div> element names and timing data to control when JavaScript or another scripting engine is used to change a style property that controls visibility of the various <div> elements so that they are visible in sequence. Continuing with the example above, data can be included in a JSON object so that the <div> element corresponding to frames 1-10 is displayed for a first period of time and then the <div> element corresponding to frames 10-20 is displayed (followed by later frames).

Block 506 also represents including a markup element to define the rendered appearance of each keyframe. For example, animation coding engine 104 can include a plurality of markup code elements such as <canvas> elements with drawing commands suitable to recreate a rendered appearance of each frame in that portion of the animation sequence. Visual assets can be positioned in the keyframes as appropriate. For example, SVG or other graphics can be used to reduce drawing and other processing time.

Blocks 508A-508B represent how different portions of the animation sequence can be handled based on whether the portion can be reproduced using animation primitives. For example, animation coding engine 104 may analyze the object motion defined in timeline data 106 and/or may rely on definitions of motion included in data 106 to determine whether motion of one or more objects maps to a primitive.

For instance, the Flash® platform supports different types of animation, including a "Shape tween" which relies on data defining two shapes, with timeline data 106 including a command for the player to interpolate the frames that came between those two shapes (e.g., by using shape morphing capabilities built into the player). The Flash® platform also supports a "classic tween" that animates the transformations and properties of the effects applied to a symbol between two moments in time. The player has to interpolate the transformations applied in the frames between the two key points. The Flash® platform also supports a "motion tween" similar to the classic tween, which uses key points and other data to specify motion.

In one implementation, animation coding engine 104 determines whether a portion of the animation is specified as a "shape tween." If so, animation coding engine 104 uses the approach at block 508A for that portion and converts that portion of the animation to a sequence of directly rendered frames and determines appropriate syntax (e.g., <canvas> element commands) to draw each frame. For instance, for portion 103B of animation sequence 102, each frame of the distortion and bounce of ball 103 can be rendered and analyzed to determine <canvas> or other commands to render the frame. The <canvas> element for rendered frame can be included in a <div> element or other container, with timing and transition data included in the structured data object so that the rendered frames are presented in order.

Block 508B represents how animation coding engine 104 addresses portions of the animation sequence that can be represented using an animation primitive definable as a style. In particular, the animation coding engine includes an element in the markup code representing a visual asset in the animation sequence and the animation coding engine includes a style in the style sheet to apply the animation primitive to the visual asset.

For example, for "classic" and "motion" tweens, animation coding engine 104 selects a CSS or other animation primitive and includes a style definition in the stylesheet. Animation coding engine 104 also includes timing data in the structured data object to trigger and coordinate rendering using the animation primitives. For example, different visual assets (e.g., SVG files) can be included in embedded containers within keyframes (e.g., <div> containers within <canvas> elements in a <div> for the keyframe) with the container name used to apply the respective styles to assets. The animations can be triggered by including parameters in the structured data object to trigger the primitive(s) when the container for the keyframe is made visible.

The styles can themselves be defined using parameter values that preserve the relative timing of the animations of various assets and spatial relationship of the assets over the course of the animation. For example, certain animations may be delayed relative to others and/or repeated, with duration values for the animation primitives used to control relative speed between animations. Coordinate values can be included in the style definitions so that the arrangement of the visual assets remains true to the original animation sequence as assets are translated, rotated, distorted, and the like. The visual assets may themselves be included as files (e.g., raster image files, scalable vector graphics files) or may be defined as elements in the markup code.

For example, if the asset translates across the stage, then the animation coding engine can select an animation primitive that, when processed by the rendering application, causes the rendering application to move the visual asset to a second position in the interface of the rendering application corresponding to the second position of the visual asset on the stage.

As a particular example, the webkit-transform primitive can be selected for use as a style applied to a visual asset representing ball 103 in portions 103A and 103C of animation sequence 102, with values to define the starting and ending locations and a desired rate for the translation can be determined. If ball 103 also rotates, a rotation primitive can be selected through a similar analysis. Transitions (e.g., fade-in, fade-out), distortions, and other manipulations supported as animation primitives can be identified as well.

Thus, for portion 103A of animation sequence 102, a keyframe can be rendered and then ball 103 can be animated using a webkit-transform or other primitive, to be followed by direct renderings of frames representing portion 103B, followed by a keyframe representing the start of portion 103C, with motion of ball 103 provided using another primitive. The color change of ball 103 may be provided by using a different visual asset, a drawing command, or by directly rendering the color transition using a plurality of frames in portion 103C until the final appearance is reached.

Block 510 represents including suitable scripting elements or references to scripting elements to control the appearance of containers and timing of animation primitives. For instance, a JavaScript file can be embedded in or referenced by the markup code that includes the <div> containers, <canvas> elements, and references to the visual assets. The JavaScript file can be used to display the keyframes and rendered frames in order, transition between frames, and trigger animation primitives to orchestrate the animation according to data in a JSON object (or other structured data element) included in the code package.

An animation sequence can be divided into multiple portions to be represented using animation primitives and directly-rendered frames. In some implementations, shorter animated portions can be composited—for example, multiple classic tweens can be merged together into a single animation based on a primitive. The balance of primitive-driven versus directly-rendered animated portions can vary, and as noted above may even depend on whether the code package is being custom-generated for a particular rendering application.

An implementation could utilize mostly or only directly-rendered keyframes, but performance might suffer on at least some platforms. By using style-based animation primitives when available, animation coding engine 104 can provide code that leverages the graphics power of rendering applications. For instance, CSS-based animations may be rendered directly according to native code (e.g., optimized binary code of the application) or using graphics processing unit (GPU) accelerated rendering processes. Nonetheless, more complex effects can be preserved by using sequences of directly-rendered frames.

Block 510 also represents including one or more scripting elements to provide a scripted function defined in timeline data 106. For example, the Flash® platform supports scripted events, such as functions defined using Actionscript™ or JavaScript. In particular, the scripted events can include visual effects such as changes in object appearance in response to clicks, mouseovers, or other events; other effects such as popup windows, network requests, etc; or other custom behavior. Animation coding engine 104 can track which object(s) in timeline data 106 are associated with scripted functionality in timeline data 106 and determine corresponding elements in code package 108 (e.g., corresponding visual assets, containers, <canvas> elements, etc.). When code package 108 is generated, corresponding scripting elements can be included in code package 108 to provide the scripted function.

For example, if timeline data 106 includes a JavaScript function associated with a graphical object, then the JavaScript function can be included in or referenced by the markup code in code package 108, with object and variable references updated to reflect the conversion process so that the included JavaScript references the element(s) used to represent the graphical object.

Figure 6:
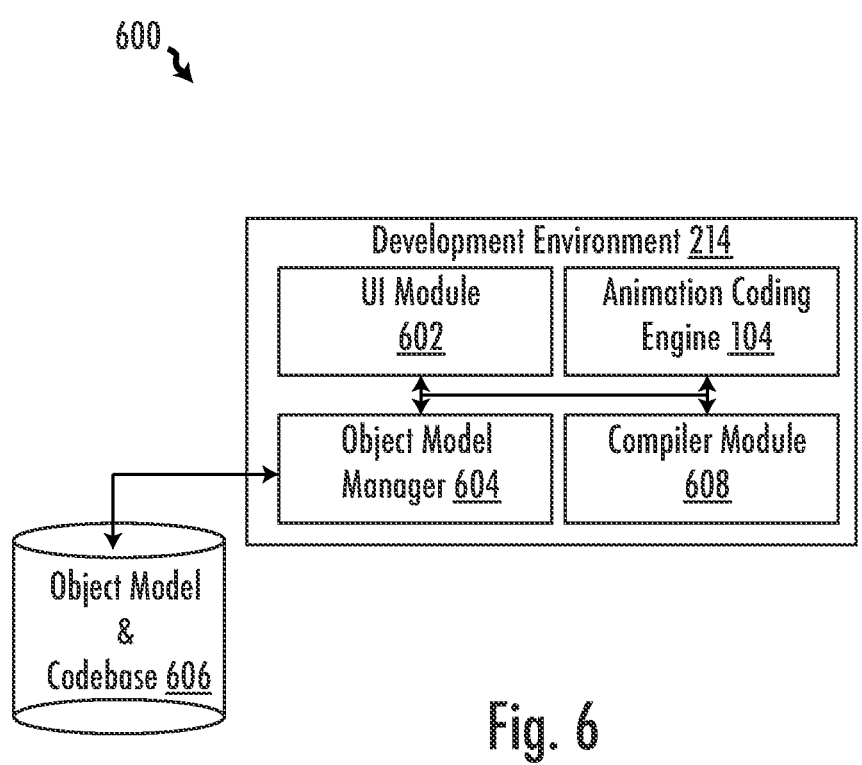
FIG. 6 is a block diagram showing an illustrative architecture for a development environment that utilizes an animation coding engine configured according to the present subject matter

FIG. 6 is a block diagram showing an illustrative architecture 600 for a development environment 214 that utilizes an animation coding engine 104 configured in accordance with the present subject matter. In this example, application development environment 214 also includes a UI module 602 used to provide a graphical user interface and receive user input. For example, UI module can render graphical user interface 216 of FIG. 2, including design stage 218, timeline view 220, and other interfaces (e.g., code view interface, etc.) and populate the interface with animation sequence 102 as the sequence is defined/edited.

Object model manager module 604 can access stored data representing a core object model and codebase 606 for the application under development. The object model/codebase can include data representing the various application components, including media elements, scripting components, and the like and is representative of timeline data 106 used by animation coding module 104. For example, module 604 can store vector, raster, or other graphics representing ball 103 along with data defining the location of ball 103 in various frames, along with desired motion effects as ball 103 changes position in the different frames.

As discussed above, animation coding engine 104 can use timeline data 106 to decompose an animation sequence into a plurality of visual assets and select corresponding animation primitives to be applied to those visual assets in order to replicate the animation sequence by way of a code package 108 processed by a rendering application, with directly-rendered keyframes used for one or more portion(s) of the animation not reproduced using primitives. As needed, scripting components applied to timeline elements can be converted and included in code package 108 as well.

Animation coding engine 104 can, for example, carry out analysis according to FIGS. 3-5 discussed above. Development application 212 also includes compiler module 608. Compiler module 608 can use the object model/codebase to produce executable or interpretable code of the application under development. Output code may, for example, comprise SWF files or AIR files for execution using Adobe® Flash® or AIR®, files for execution in another runtime environment, files for execution in an operating system, or the like.

It will be understood that the present subject matter can be used regardless of the format or type of the application under development, and construction and use of appropriate compilers, linkers, and packaging components (e.g., for cross-platform compatibility) will be within the ability of one of skill in the art. This may allow a developer to generate an animation sequence once and then output the sequence in multiple different formats (e.g., in HTML/CSS3 and as a Flash® application).

Animation coding engine 104 is shown integrated into development environment 214 in this example. It will be understood that animation coding engine 104 can operate independently of development environment 214. For example, animation coding engine 104 could be implemented with its own UI module used to select files containing timeline data 106 and convert those files into a code package 108. Additionally, animation coding engine 104 could be provided as a web service or another hosted service or could be employed at a device (e.g., a client device) to convert incoming files to a format usable by the device.

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

Although several examples featured mobile devices, the various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

A computing device may access one or more non-transitory computer-readable media that embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, mobile devices (e.g., tablets, smartphones, personal digital assistants (PDAs), etc.) televisions, television set-top boxes, portable music players, and consumer electronic devices such as cameras, camcorders, and mobile devices. Computing devices may be integrated into other devices, e.g. "smart" appliances, automobiles, kiosks, and the like.

Embodiments of the methods disclosed herein may be performed in the operation of computing devices. The order of the blocks presented in the examples above can be varied—for example, blocks can be re-ordered, combined, and/or broken into sub-blocks. Certain blocks or processes can be performed in parallel.

Any suitable non-transitory computer-readable medium or media may be used to implement or practice the presently-disclosed subject matter, including, but not limited to, diskettes, drives, magnetic-based storage media, optical storage media (e.g., CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A computer-implemented method, comprising:
   accessing data defining an animation sequence with timeline data over a number of keyframes, the animation sequence depicting motion of at least one object over time;
   accessing data identifying animation primitives supported by a client rendering platform;
   analyzing the data defining the animation sequence to determine a first portion of the animation sequence that can be represented using a set of visual assets animated using a portion of the animation primitives supported by the client rendering platform and a second portion of the animation sequence that can be represented by using a scripting language to control transitions between frames defined in the animation sequence representing the second portion, wherein at least some of the frames of the second portion of the animation sequence include animation primitives that are not natively supported by the client rendering platform; and
   generating a package, the package comprising markup code referencing the visual assets and defining an appearance of the frames, a stylesheet referencing the animation primitives, and a structured data object,
   the markup code generated to cause a rendering application of the client rendering platform to provide the animation sequence by using the scripting language to coordinate rendering of each of the first portion and the second portion according to a parameter included in the structured data object, the first portion rendered by applying the animation primitives as styles in the stylesheet to the set of visual assets, wherein the styles are applied to move the animation primitives, and the second portion rendered by drawing each frame of the second portion by using the scripting language, wherein a frame of the first portion and a frame of the second portion are rendered next to each other in a temporal sequence.

2. The computer-implemented method of claim 1, wherein the data defining the animation sequence comprises a scripting element defining a function associated with the at least one object and generating the package comprises including a corresponding scripting element to cause the rendering application to provide the function.

3. The method of claim 1, wherein analyzing the data defining the animation sequence comprises determining whether the motion of the object over time corresponds to an animation primitive supported by a browser, wherein if the motion does not correspond to an animation primitive supported by a browser, the motion is represented by using a plurality of frames.

4. The method of claim 1, wherein the structured data object indicates to the scripting language which elements in the markup code correspond to certain frames and further indicates to the scripting language when frames are to be made visible.

5. The method of claim 1, further comprising:
   using the data defining the animation sequence to generate a runtime application that provides the animation sequence.

6. The computer-implemented method of claim 1, further comprising analyzing the data defining the animation sequence to determine whether the second portion of the animation sequence can be represented using the animation primitives definable as the styles;
   based on determining that the second portion of the animation sequence cannot be represented using the animation primitives definable as the styles, the package including a plurality of markup code elements in the markup code, each markup code element corresponding to a rendered appearance of a particular frame of the second portion of the animation sequence, and the parameter in the structured data object controlling rendering of the plurality of markup code elements so as to display the frames in sequence;

analyzing the data defining the animation sequence to determine whether the first portion of the animation sequence can be represented using the animation primitives definable as the styles; and based on determining that the first portion of the animation sequence can be represented using the animation primitives definable as the styles, the package including elements in the markup code representing the set of visual assets in the animation sequence, and including the styles in the style sheet to apply the animation primitives to the visual assets.

7. A computerized device, comprising:

a hardware interconnect; and a data processing hardware element interfaced to the hardware interconnect, wherein the data processing hardware element implements an animation coding engine to:

analyze timeline data over a number of keyframes defining an animation sequence depicting motion of at least one object over time and generate a code package, and identify a first portion of the animation sequence that can be represented by animation primitives supported by a client rendering platform and a second portion of the animation sequence that can be represented by using a scripting language to control transitions between frames defined in the animation sequence representing the second portion, wherein at least some of the frames of the second portion of the animation sequence include animation primitives that are not natively supported by the client rendering platform;

the code package representing the animation sequence using markup code that defines a rendered appearance of a plurality of frames of the animation sequence, the code package comprising the markup code, a stylesheet referencing the animation primitives, and a structured data object defining a parameter used by the scripting language in transitioning between the plurality of frames such that a frame of the first portion and a frame of the second portion of the animation sequence appear next to each other in a temporal sequence, wherein the first portion is rendered by applying the animation primitives as styles in the stylesheet to a set of visual assets, wherein the styles are applied to move the animation primitives, and wherein the second portion is rendered by drawing each frame of the second portion by using the scripting language.

8. The computerized device of claim 7, wherein the markup code comprises a reference to a visual asset included within a particular frame and the code package further comprises a cascading style sheet defining an animation primitive as a style to be applied to the asset.

9. The computerized device of claim 8, wherein:

the markup code comprises a reference to a first markup container element comprising code defining a rendered appearance of a first frame, the markup code comprises a reference to a second markup container element comprising code defining a rendered appearance of a second frame, and the parameter in the structured data object indicates respective times during which the contents of the first and second markup container elements are to be visible.

10. The computerized device of claim 9, wherein the parameter in the structured data object controls when the scripting language is to be used to change a style property that controls visibility of the first and second markup container elements.

11. The computerized device of claim 9, wherein the markup code further comprises a reference to a visual asset, the reference included in one of the first and second frames and associated with a style that defines an animation primitive to be applied to animate the visual asset.

12. The computerized device of claim 8, wherein the animation coding engine analyzes the timeline data defining the animation sequence to determine whether each of the first portion and the second portion of the animation sequence can be represented using the animation primitive definable as the style; and based on determining that the second portion of the animation sequence cannot be represented using the animation primitive definable as the style:

the animation coding engine includes a plurality of markup code elements in the markup code, each markup code element corresponding to a rendered appearance of a frame of the second portion of the animation sequence, and the parameter in the structured data object controls rendering of the plurality of markup code elements so as to display the frames of the second portion in sequence;

based on determining that the first portion of the animation sequence can be represented using the animation primitive definable as the style:

the animation coding engine includes an element in the markup code representing a visual asset in the animation sequence, and the animation coding engine includes the style in the style sheet to apply the animation primitive to the visual asset.

13. The computerized device of claim 8, wherein the scripting language comprises JavaScript and the structured data object comprises a JSON (JavaScript Object Notation) object.

14. The computerized device of claim 8, wherein the animation coding engine further identifies a scripting element applied to an element in the timeline data and includes, in the code package, a corresponding scripting element to be applied to a corresponding asset in the markup code.

15. The computerized device of claim 8, wherein the data processing hardware comprises a processor and the animation coding engine comprises program logic accessible by the processor.

16. The computerized device of claim 8, wherein the animation coding engine is comprised in a development environment further configured to use the timeline data to generate a runtime application that provides the animation sequence.

17. A computer program product comprising a non-transitory computer-readable medium embodying program code, the program code comprising:

code for providing a design canvas and receiving input specifying an animation sequence representing a varying appearance of at least one animated object on a stage over time, wherein the animation sequence is defined with timeline data over a number of keyframes;

code for storing data defining the animation sequence;

code for identifying animation primitives supported by a client rendering platform;

code for analyzing the data defining the animation sequence to determine a first portion of the animation sequence that can be represented using a set of visual assets animated using a portion of the animation primitives supported by the client rendering platform and a second portion of the animation sequence that can be represented by using a scripting language to control transitions between frames defined in the animation sequence representing the second portion, wherein at least some of the frames of the second portion of the animation sequence include animation primitives that are not natively supported by the client rendering platform; and code for generating a package, the package comprising:

markup code referencing visual assets of the set of visual assets and defining an appearance of frames, a stylesheet referencing the animation primitives, and a structured data object, the markup code generated to cause a rendering application of the client rendering platform to provide the animation sequence by using the scripting language to coordinate rendering of each of the first portion and the second portion according to a parameter included in the structured data object, the first portion rendered by applying the animation primitives as styles in the stylesheet to the set of visual assets, wherein the styles are applied to move the animation primitives, and the second portion rendered by drawing each frame of the second portion by using the scripting language, wherein a frame of the first portion and a frame of the second portion are rendered next to each other in a temporal sequence.

18. The computer program product of claim 17, wherein the stylesheet invoking the animation primitives supported by the client rendering platform, the structured data object indicating when one of the animation primitives is to be applied to a visual asset in a frame of the first portion of the animation sequence without transitioning to a different frame.

19. The computer program product of claim 18, wherein the visual asset is included in a portion of the markup code defining a rendered appearance of a frame.

20. The computer program product of claim 17, further comprising:

program code for generating a runtime application based on the data defining the animation sequence, the runtime application configured to provide the animation sequence when executed.

* * * * *